United States Patent
Özgüç et al.

(10) Patent No.: US 9,239,157 B2
(45) Date of Patent: Jan. 19, 2016

(54) LIGHT-EMITTING MEANS, IN PARTICULAR FOR OPERATION IN LAMPHOLDERS FOR FLUORESCENT LAMPS

(76) Inventors: Rasit Özgüç, Dinslaken (DE); Volker Heil, Oberhausen (DE); Udo Piontek, Bottrop (DE)

( * ) Notice: Subject to any disclaimer, the term of this patent is extended or adjusted under 35 U.S.C. 154(b) by 430 days.

(21) Appl. No.: 13/818,819

(22) PCT Filed: Aug. 26, 2011

(86) PCT No.: PCT/EP2011/064757
§ 371 (c)(1),
(2), (4) Date: May 6, 2013

(87) PCT Pub. No.: WO2012/025626
PCT Pub. Date: Mar. 1, 2012

(65) Prior Publication Data
US 2013/0241443 A1    Sep. 19, 2013

(30) Foreign Application Priority Data
Aug. 26, 2010  (DE) .......... 10 2010 035 624

(51) Int. Cl.
*H05B 39/06*  (2006.01)
*F21V 23/04*  (2006.01)
(Continued)

(52) U.S. Cl.
CPC ........... *F21V 23/04* (2013.01); *F21K 9/135* (2013.01); *F21K 9/175* (2013.01); *F21V 25/04* (2013.01);
(Continued)

(58) Field of Classification Search
CPC ............ H01R 33/0854; F21V 23/04
USPC ................ 315/362; 439/226–243; 362/217.01–225
See application file for complete search history.

(56) References Cited
U.S. PATENT DOCUMENTS 2,799,801 A * 7/1957 Freeman ............ 315/32
4,211,958 A   7/1980 Bickford et al.
(Continued)

FOREIGN PATENT DOCUMENTS

CN    2819029 Y    9/2006
CN    2826755 Y    10/2006
(Continued)

OTHER PUBLICATIONS

Matrix Lighting; LEDs Magazine; www.viribright.com; www.viribright.com.cn; Feb. 2011; PennWell.
(Continued)

*Primary Examiner* — Sibin Chen
*Assistant Examiner* — Metasebia Retebo
(74) *Attorney, Agent, or Firm* — Miltons IP/p.i.

(57) ABSTRACT

The invention relates to luminaires, especially luminaires to be operated in lamp holders for fluorescent lamps. In order to prevent individuals from experiencing electric shocks when inserting a luminaire, for example in the lamp holder of a fluorescent lamp, and in order to be able to operate the luminaire without complications once it is inserted in the lamp holder, the luminaire comprises a contact section to be inserted into a socket base, comprising two contact pins (B1, B2) and a centering device (BX) for centering the luminaire in the socket, which is mounted in the center between the contact pins (B1, B2). The centering device (BX) can be rotated about a main axis of the luminaire to actuate a switch or a protective device.

29 Claims, 16 Drawing Sheets

Figure 1A:
Figure 1B:
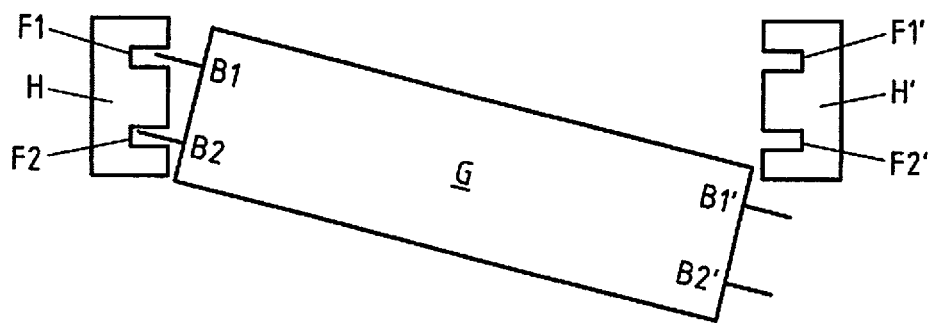
Figure 1C:
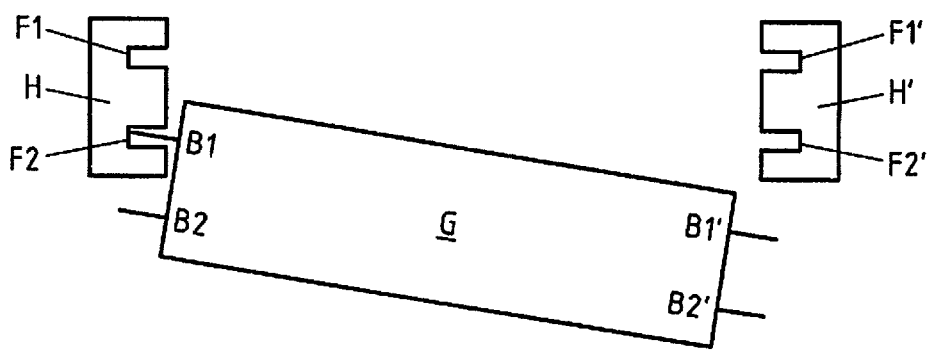
Figure 1D:
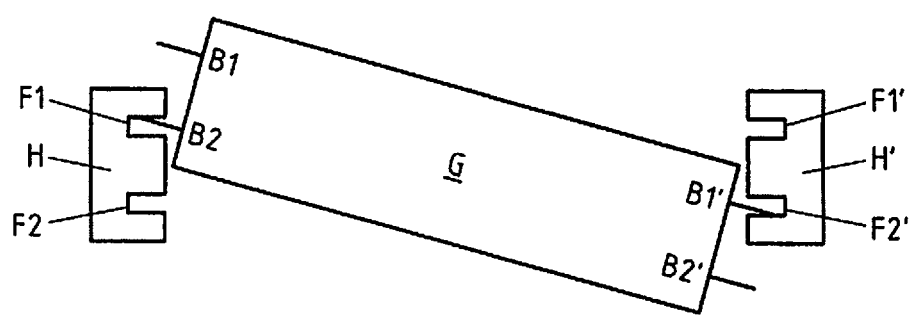
Figure 1E:
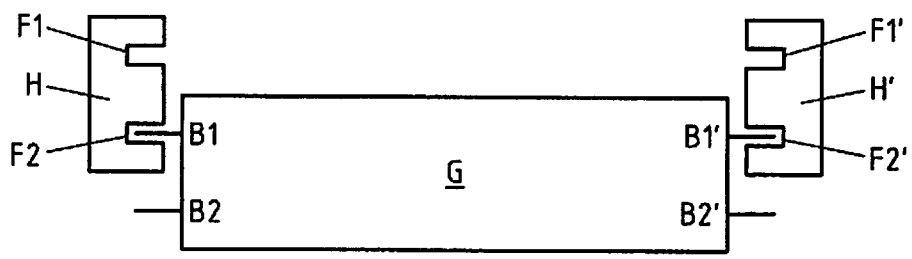

(51) Int. Cl.
- *F21K 99/00* (2010.01)
- *F21V 25/04* (2006.01)
- *H01R 33/08* (2006.01)
- *H01R 33/96* (2006.01)
- *H05B 33/08* (2006.01)
- *F21Y 101/02* (2006.01)
- *F21Y 103/00* (2006.01)

(52) U.S. Cl.
CPC ............ *H01R 33/0854* (2013.01); *H01R 33/96* (2013.01); *H05B 33/0806* (2013.01); *F21Y 2101/02* (2013.01); *F21Y 2103/003* (2013.01); *Y02B 20/341* (2013.01); *Y02B 20/383* (2013.01); *Y02B 20/386* (2013.01)

(56) References Cited

U.S. PATENT DOCUMENTS

| | | | |
|---|---|---|---|
| 4,912,371 | A | 3/1990 | Hamilton |
| 5,616,042 | A * | 4/1997 | Raby et al. ............... 439/226 |
| 6,762,562 | B2 | 7/2004 | Leong |
| 7,488,086 | B2 | 2/2009 | Wu et al. |
| 7,510,299 | B2 | 3/2009 | Timmermans et al. |
| 8,322,878 | B2 * | 12/2012 | Hsia et al. ............... 362/221 |
| 2002/0060526 | A1 | 5/2002 | Timmermans et al. |
| 2006/0061300 | A1 | 3/2006 | Biebl et al. |
| 2006/0176699 | A1 | 8/2006 | Crunk |
| 2009/0128006 | A1 | 5/2009 | Zhuang et al. |
| 2009/0159919 | A1 | 6/2009 | Simon et al. |
| 2009/0175046 | A1 | 7/2009 | Richard |
| 2010/0181178 | A1 * | 7/2010 | Chang et al. ............... 200/341 |
| 2011/0149563 | A1 | 6/2011 | Hsia et al. |

FOREIGN PATENT DOCUMENTS

| | | | |
|---|---|---|---|
| CN | 1880402 A | 12/2006 | |
| CN | 1962811 A | 5/2007 | |
| CN | 2906297 Y | 5/2007 | |
| CN | 2908989 Y | 6/2007 | |
| CN | 2926767 Y | 7/2007 | |
| CN | 2926772 Y | 7/2007 | |
| CN | 200980183 Y | 11/2007 | |
| CN | 200993322 Y | 12/2007 | |
| CN | 200995186 Y | 12/2007 | |
| CN | 200997403 Y | 12/2007 | |
| CN | 101144587 A | 3/2008 | |
| CN | 101144588 A | 3/2008 | |
| CN | 101144591 A | 3/2008 | |
| CN | 101144606 A | 3/2008 | |
| CN | 201032075 Y | 3/2008 | |
| CN | 201034306 Y | 3/2008 | |
| CN | 201037977 Y | 3/2008 | |
| CN | 101162744 A | 4/2008 | |
| CN | 201053620 Y | 4/2008 | |
| CN | 101191770 A | 6/2008 | |
| CN | 201078589 Y | 6/2008 | |
| CN | 201081165 Y | 7/2008 | |
| CN | 201083339 Y | 7/2008 | |
| CN | 201106776 Y | 8/2008 | |
| CN | 201137827 Y | 10/2008 | |
| CN | 101329039 A | 12/2008 | |
| CN | 201159437 Y | 12/2008 | |
| CN | 201170502 Y | 12/2008 | |
| CN | 201177246 Y | 1/2009 | |
| CN | 201183038 Y | 1/2009 | |
| CN | 201184549 Y | 1/2009 | |
| CN | 201198971 Y | 2/2009 | |
| CN | 201198972 Y | 2/2009 | |
| CN | 201198987 Y | 2/2009 | |
| CN | 101391803 A | 3/2009 | |
| CN | 201206784 Y | 3/2009 | |
| CN | 201209833 Y | 3/2009 | |
| CN | 201210762 Y | 3/2009 | |
| CN | 201221688 Y | 4/2009 | |
| CN | 201221697 Y | 4/2009 | |
| CN | 201228872 Y | 4/2009 | |
| CN | 101436627 A | 5/2009 | |
| CN | 201232873 Y | 5/2009 | |
| CN | 201232957 Y | 5/2009 | |
| CN | 201234373 Y | 5/2009 | |
| CN | 201255390 Y | 6/2009 | |
| CN | 201259100 Y | 6/2009 | |
| CN | 201259183 Y | 6/2009 | |
| CN | 201263230 Y | 6/2009 | |
| CN | 201263231 Y | 6/2009 | |
| CN | 101478023 A | 7/2009 | |
| CN | 201265844 Y | 7/2009 | |
| CN | 201277509 Y | 7/2009 | |
| CN | 201281251 Y | 7/2009 | |
| CN | 101509621 A | 8/2009 | |
| CN | 201284944 Y | 8/2009 | |
| CN | 201284995 Y | 8/2009 | |
| CN | 201289019 Y | 8/2009 | |
| CN | 201293218 Y | 8/2009 | |
| CN | 201293219 Y | 8/2009 | |
| CN | 101539277 A | 9/2009 | |
| CN | 101541132 A | 9/2009 | |
| CN | 201302065 Y | 9/2009 | |
| CN | 201302115 Y | 9/2009 | |
| CN | 201306623 Y | 9/2009 | |
| CN | 201314532 Y | 9/2009 | |
| CN | 201318576 Y | 9/2009 | |
| CN | 201318580 Y | 9/2009 | |
| CN | 101561475 A | 10/2009 | |
| CN | 201322253 Y | 10/2009 | |
| CN | 201326917 Y | 10/2009 | |
| CN | 201326918 Y | 10/2009 | |
| CN | 201326995 Y | 10/2009 | |
| CN | 201326997 Y | 10/2009 | |
| CN | 201330948 Y | 10/2009 | |
| CN | 201330952 Y | 10/2009 | |
| CN | 201330953 Y | 10/2009 | |
| CN | 201330956 Y | 10/2009 | |
| CN | 201335329 Y | 10/2009 | |
| CN | 101576208 Y | 11/2009 | |
| CN | 101576209 A | 11/2009 | |
| CN | 201339887 Y | 11/2009 | |
| CN | 201344486 Y | 11/2009 | |
| CN | 201348191 Y | 11/2009 | |
| CN | 201348216 Y | 11/2009 | |
| CN | 201348218 Y | 11/2009 | |
| CN | 201348227 Y | 11/2009 | |
| CN | 201351866 Y | 11/2009 | |
| CN | 201351882 Y | 11/2009 | |
| CN | 101737664 A | 6/2010 | |
| CN | 201672283 U | 12/2010 | |
| CN | 202048395 U | 11/2011 | |
| DE | 891 108 | 9/1953 | |
| DE | 19707048 A1 | 6/1998 | |
| DE | 202007002822 U | 5/2007 | |
| DE | 202007002822 U1 | 5/2007 | |
| DE | 202010008186 U1 | 10/2010 | |
| DE | 102010003266 A1 | 9/2011 | |
| EP | 2 366 948 A2 | 9/2011 | |
| EP | 2 381 159 A2 | 10/2011 | |
| FR | 1 369 263 | 6/1964 | |
| GB | 2111767 A | 7/1983 | |
| GB | 2 319 901 A | 6/1998 | |
| GB | 2319901 A * | 6/1998 | ............ H01R 33/96 |
| JP | 10105076 A2 | 4/1998 | |
| JP | 2001-043945 A | 2/2001 | |
| JP | 3142652 U | 6/2008 | |
| JP | 2008130535 A2 | 6/2008 | |
| JP | 3153538 U | 9/2009 | |
| JP | 4328379 B1 | 9/2009 | |
| JP | 3154843 U | 10/2009 | |
| JP | 3155018 U | 11/2009 | |
| JP | 2010-192229 A | 9/2010 | |
| KR | 20060111115 A | 10/2006 | |
| KR | 20080003333 U | 8/2008 | |
| KR | 20080003933 U | 9/2008 | |
| KR | 20090028174 A | 3/2009 | |
| KR | 100902035 B1 | 6/2009 | |

(56) References Cited

FOREIGN PATENT DOCUMENTS

| | | |
|---|---|---|
| KR | 100905228 B1 | 7/2009 |
| KR | 100908733 B1 | 7/2009 |
| KR | 20090008917 U | 9/2009 |
| KR | 100924709 B1 | 11/2009 |
| KR | 20090011781 U | 11/2009 |
| KR | 20090118147 A | 11/2009 |
| KR | 20090123110 A | 12/2009 |
| KR | 20090123116 A | 12/2009 |
| KR | 20090132808 A | 12/2009 |
| KR | 20100010060 A | 1/2010 |
| KR | 20100010060KR A | 1/2010 |
| KR | 20100012849 A | 2/2010 |
| RU | 87822 U1 | 10/2009 |
| TW | M320636 Y | 10/2007 |
| TW | M320641 Y | 10/2007 |
| TW | M320644 Y | 10/2007 |
| TW | M344427 Y | 11/2008 |
| TW | M354694 Y | 4/2009 |
| TW | M354695 Y | 4/2009 |
| TW | M358919 Y | 6/2009 |
| WO | WO 03/043141 A1 | 5/2003 |
| WO | WO 2007/015274 A1 | 2/2007 |
| WO | WO 2007/072581 A1 | 6/2007 |
| WO | WO 2008/110959 A1 | 9/2008 |
| WO | WO 2009/061124 A2 | 5/2009 |
| WO | WO2009/061124 A2 | 5/2009 |
| WO | WO 2009/067074 A1 | 5/2009 |
| WO | WO 2009/094908 A1 | 8/2009 |
| WO | WO2009/094908 A1 | 8/2009 |
| WO | WO 2009/111978 A1 | 9/2009 |
| WO | WO2009/131340 A2 | 10/2009 |
| WO | WO 2009/131340 A2 | 10/2009 |
| WO | WO 2009/136380 A1 | 11/2009 |
| WO | WO 2009/140840 A1 | 11/2009 |
| WO | WO 2009/152688 A1 | 12/2009 |
| WO | WO2009/152688 A1 | 12/2009 |
| WO | WO 2009/154321 A | 12/2009 |
| WO | WO2009/154321 A1 | 12/2009 |
| WO | WO 2009154162 A1 * | 12/2009 |
| WO | WO 2009/131340 A3 | 1/2010 |
| WO | WO 2010/069983 A1 | 6/2010 |
| WO | WO 2011/124683 A1 | 10/2011 |

OTHER PUBLICATIONS

Matrix Lighting; LEDs Magazine; www.viribright.com; www.viribright.com.cn; Nov./Dec. 2010; PennWell.

Hawk, Kathy D.; Matrix Lighting Inc.; "Viribright LED Light Bulbs"; www.viribright.com; Jan. 2011.

Li, Rob; UL (Underwriters Laboratories Inc.); Matrix Lighting Ltd.—Initial Production Inspection (T8 certificaton report); 32 pages; Nov. 10, 2010; Mexico.

Hewson, Steven; Carney, William R.; UL (Underwriters Laboratories Inc.); Matrix Lighting Ltd.—Follow-Up Service Procedure (T8 certification report); 1 page; Nov. 9, 2010; Nov. 10, 2010.

Matrix Lighting Ltd.; "Viribright LED Lighting Solutions"; www.viribright.com; Jul. 2011; 28 pages; Van Nuys, California, USA.

PRWEB; Hawk, Kathy; Matrix Lighting, Inc.; "Matrix Lighting to Showcase Viribright LED Light Bulbs a the Upcoming Greenbuild Int'l Expo in Chicago"; 2 pages; Nov. 7, 2010.

PRWEB; Sutphen, Tamre; Matrix Lighting Inc.; "VIRIBRIGHT to Showcase LED Lighting Products at Up-Coming Trade Shows"; 2 pages; Sep. 11, 2010.

VIRIBRIGHT; T8 Tubes; 3 pages.

* cited by examiner

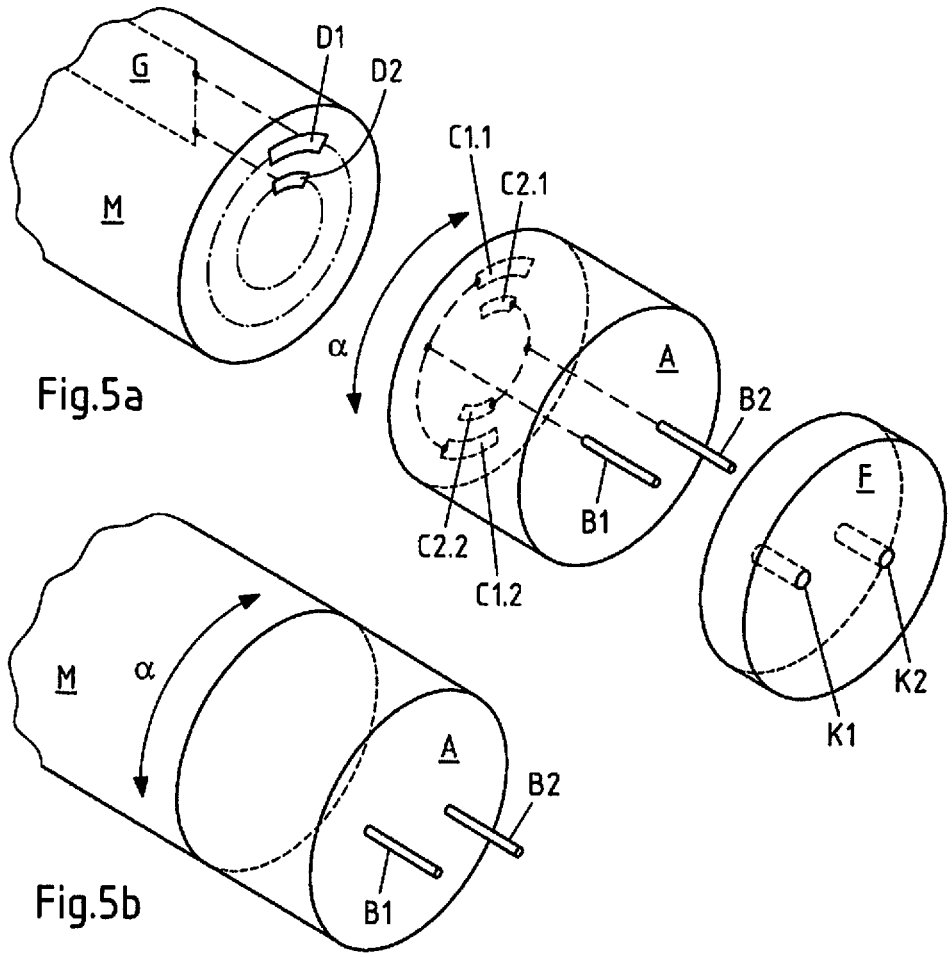
Fig.5a
Fig.5b
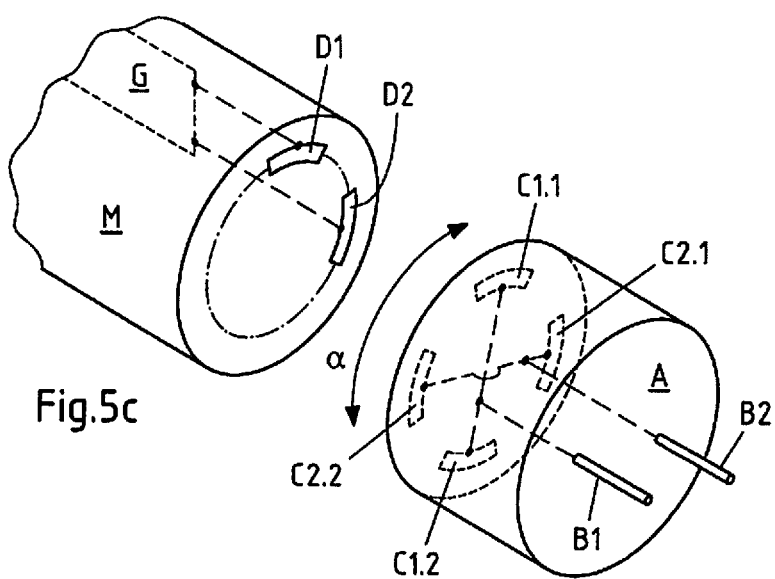
Fig.5c

LIGHT-EMITTING MEANS, IN PARTICULAR FOR OPERATION IN LAMPHOLDERS FOR FLUORESCENT LAMPS

The invention relates to light-emitting means, in particular for operation in lampholders for fluorescent lamps.

When fitting or dismantling a light-emitting means in or from the corresponding lampholder, the user may suffer an electric shock at an exposed contact if the lampholder has not been disconnected from the voltage supply. In the case of light-emitting means with two contact sections arranged opposite one another for insertion into corresponding lampholder bases of a lamp, this may be caused by only one of two contact sections being connected to the corresponding lampholder base. However, an electric shock is also possible at an individual contact section when said contact section has at least one accessible contact and one contact which is connected to the voltage source. This is so-called "side-immanent" formation of parasitic voltages.

The light-emitting means illustrated in FIGS. 1.a to 1.e has, in addition to a light-emitting unit G, the contact sections H and H', which in turn have contacts B1/B2 and B1'/B2', respectively. H and H' are the two lampholder sides with the lampholder contacts F1/F2 and F1'/F2'.

FIG. 1.a illustrates the light-emitting means in the correctly fitted case, while FIG. 1.b shows a case in which an electric shock can take place at a contact section B1'/B2' because another contact section B1/B2 is connected to the voltage source. This is also possible in the case illustrated in FIG. 1.c. However, voltage can be present from B1 also towards B2. FIGS. 1.d and 1.e show two cases in which voltage can be conducted through on both sides "side-immanently" from one contact of the same contact section, i.e. the same side, to the other.

The invention is therefore bases on the problem of specifying a light-emitting means which can avoid electric shocks during insertion of light-emitting means, for example into fluorescent lamp lampholders, and can be operated without any problems in the state installed in the lampholder.

This problem is solved by the invention which will be described in more detail below in that a contact section for insertion into a lampholder base, comprising two contact pins and a centering apparatus arranged centrally between the contact pins for centering the light-emitting means in the lampholder, is provided, and in that the centering apparatus is rotatable about a main axis of the light-emitting means for actuation of a switch or a protective apparatus.

If the described light-emitting means is inserted, for example, into a conventional lampholder for operation of fluorescent lamps, the centering apparatus is necessarily rotated and therefore a switch or another protective apparatus for avoiding formation of parasitic voltages is necessarily switched. This forced switching during insertion and initial operation of the light-emitting means can be used to bring the light-emitting means into the desired switching states, for example in order to protect the user from a formation of parasitic voltages or an electric shock.

In a first configuration of the light-emitting means, the centering apparatus can be connected to the switch or the protective apparatus, wherein the switch or the protective apparatus is preferably designed to prevent side-immanent formation of parasitic voltages and/or formation of parasitic voltages between two contact sections. This forms a very reliable and simple, in design terms, solution.

As an alternative or in addition, the protective apparatus can have a, preferably mechanically actuated, switch. In this case, the switch ensures, for example, a high degree of reliability of the protective apparatus. Mechanical switches should be provided in a particularly reliable and simple, in design terms, manner.

A simple solution in design terms can be provided as an alternative or in addition when the switch is actuated by rotation of the centering apparatus about the longitudinal axis of the light-emitting means.

It is preferred if the switch is actuated by rotation of the centering apparatus through approximately 90°, in particular if a rotation of the light-emitting means through at least 90° needs to take place in order to insert said light-emitting means into the lampholder and to bring said light-emitting means into operation.

In an effective and simple, in design terms, configuration, the switch can be in the form of a two-pole switch.

Said switch can have a single or double two-pole design. In addition, at least one such switch can be provided per contact section.

In order to automatically reproduce the original state when the light-emitting means is removed from the lampholder again, for example for renewed insertion into a lampholder, the switch can be self-resetting.

Safe initial operation without any formation of parasitic voltages can be achieved when the switch is closed by rotation of the centering apparatus for supplying voltage to a light-emitting unit of the light-emitting means.

For example from an energy point of view, it may be preferred if light-emitting diodes (LEDs) are provided as light-emitting unit of the light-emitting means. The LEDs can be provided with or without control gear technology (LED driver).

In this case, a, for example single or double, rotary potentiometer which is adjusted between a high-resistance position and a low-resistance position by rotation of the centering apparatus is also considered as the switch. In the high-resistance position, the potentiometer acts as protection against formation of parasitic voltages. In the installed state of the light-emitting means, the potentiometer is adjusted to a low resistance in order to reduce losses. The high resistance value may be of the order of magnitude of megaohms, while the low resistance value is an order of magnitude, preferably several orders of magnitude below this.

The invention inherently relates to electric light-emitting means of all operating principles, which can be inserted into multiple lampholder bases and can thereby, with at least two contacts, be plugged into a power supply. One electrical contact on a contact section could suffice if at least one further electrical contact is designated to be on at least one further contact section. However, if for example, the light-emitting means is used as a substitute for a different type of light-emitting means like a fluorescent lamp, then there can also be designated on at least one contact section an electrical non-conducting contact or a not to the relay of the light-emitting unit connected electric conducting contact in addition to an electrical conducting contact. This contact can then function as a dummy-contact, so as to provide a contact section in the accustomed or designed form or to use the dummy-contact for mechanical fastening of the light-emitting means in the lampholder.

For the purpose of this invention, light-emitting means are all electrical light-emitting means, particularly light-emitting means which feature light-emitting diods (LEDs), like in the form of conventional LED-technology, SMD-LED-technology, low voltage LEDs, low tension LEDs (for example 115V/230 V-LEDs), organic LEDs (OLEDs) and/or organic light-emitting transistors (OLET). Furthermore, the light-emitting means can be gas discharge lamps, particularly fluorescent tubes, induction lamps, glowing filament lamps, halogen-xenon lamps, other halogen-lamps, other energy saving lamps, luminous capacitors or a combination of the above mentioned light-emitting means types.

Regardless of the form of the light-emitting lighting unit of the materials, inventive light-emitting means can be such if they are plugged into a lampholder with two contacts. This includes light-emitting means for lampholders with only one holder base as well as lampholders with two or more holder bases, albeit only if one of the holder bases is current-carrying. Examples for the latter are holders for the reception of fluorescent tubes, but which are wired in such a way, so that the current supply ensues only from one of the holder bases.

In particular, it can also concern light-emitting means which connect each of two contacts with two lampholder bases. The lampholders can be designed for the intake of fluorescent tubes.

In principle, light-emitting means which are inserted into one or more lampholder bases are a possibility, as long as at least one holder base features at least three contacts.

Additionally or alternatively to a protection from formation of side-immanent parasitic voltage, the light-emitting means can have protection from the formation of parasitic voltage between two spatially separate contact sections, provided the light-emitting means features two spatially separate contact sections.

Following, several solutions for the aforementioned tasks will be described, which are based on different circuitries. The circuitries will be exemplified. The circuitries of various implementation examples or parts of them can also be combined with each other without having to address all possible combinations in the subsequent section. It is also possible to include only parts of the depicted circuits in the implementation examples. For instance, one can forego the protection from unwanted voltage transmission from a contact section to another contact section. It can also be sufficient to protect only one contact section from a formation of side-immanent parasitic voltage. This could be because an implementation example which was not depicted only has one designated contact section. Although this does not have to be the case.

This makes reference to the sketch. The sketch shows

Figure 2A:
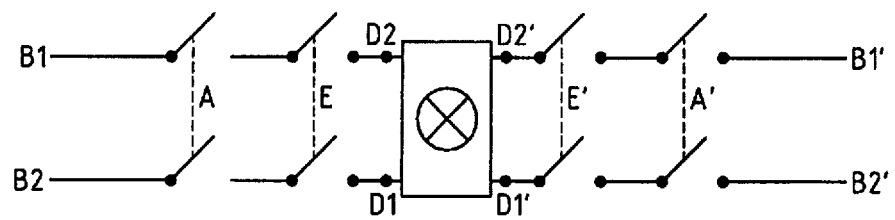
Figure 2B:
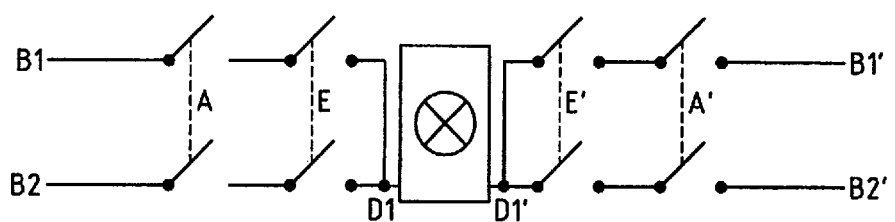
Figure 2C:
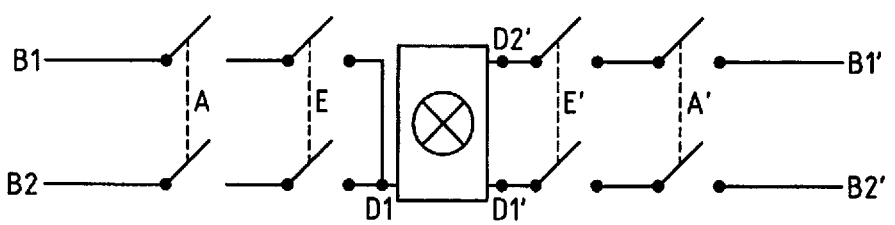
Figure 3A:
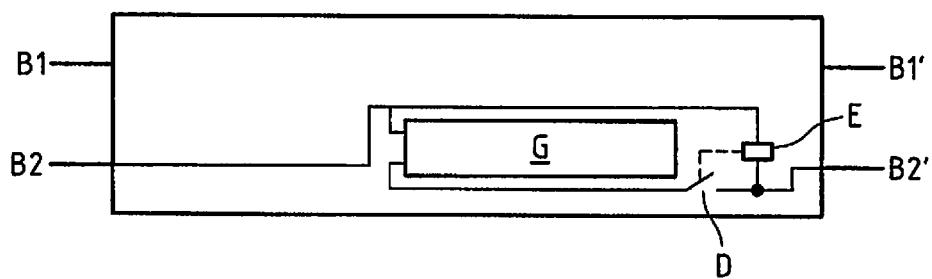
Figure 3B:
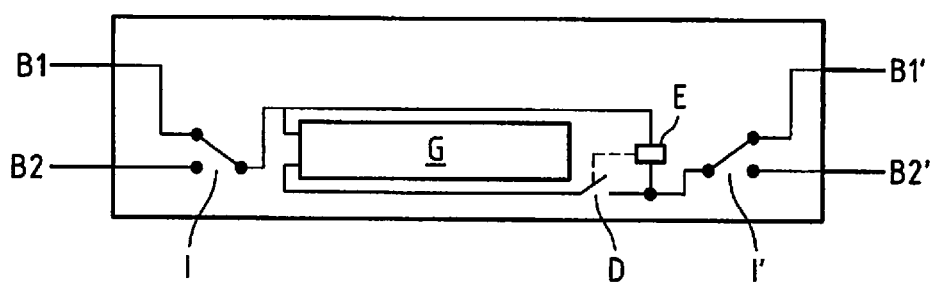
Figure 3C:
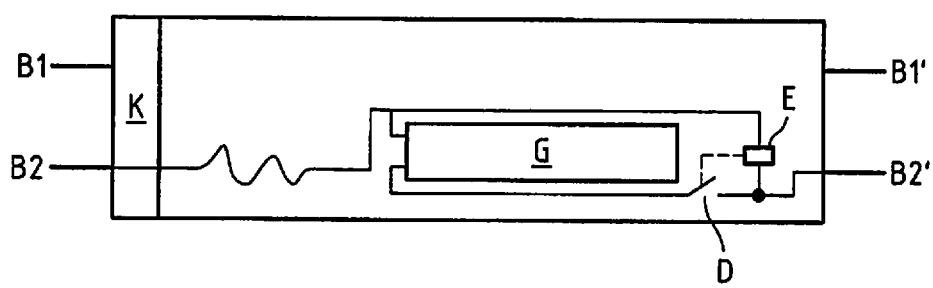
Figure 3D:
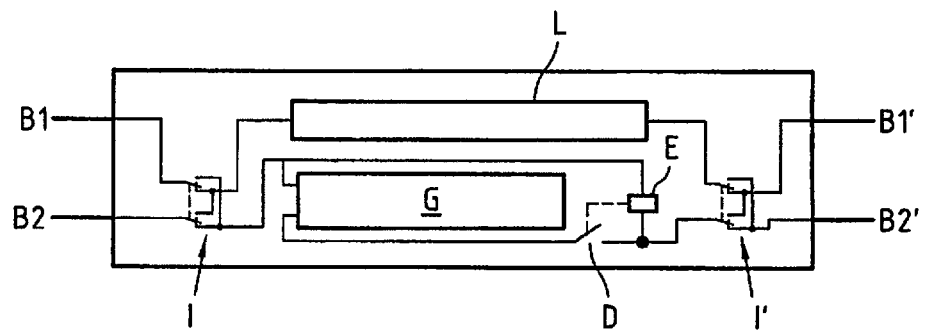
Figure 4A:
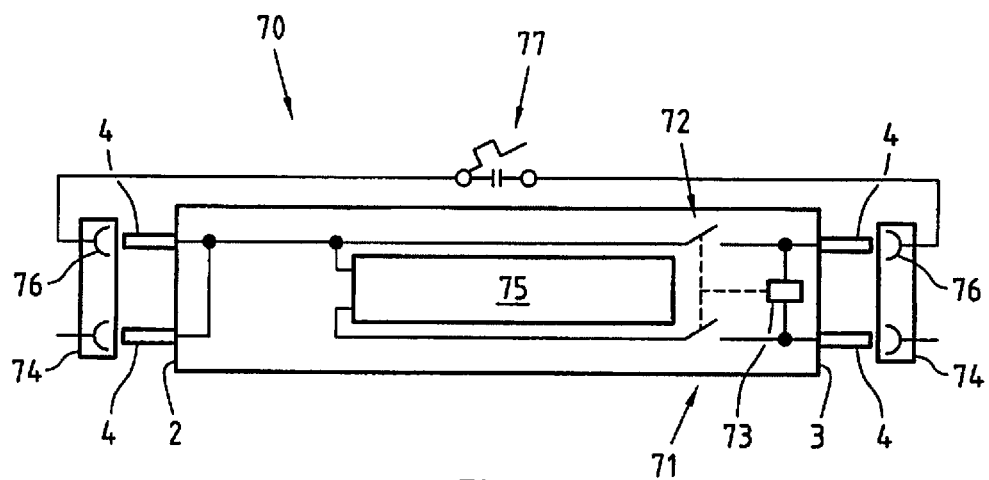
Figure 4B:
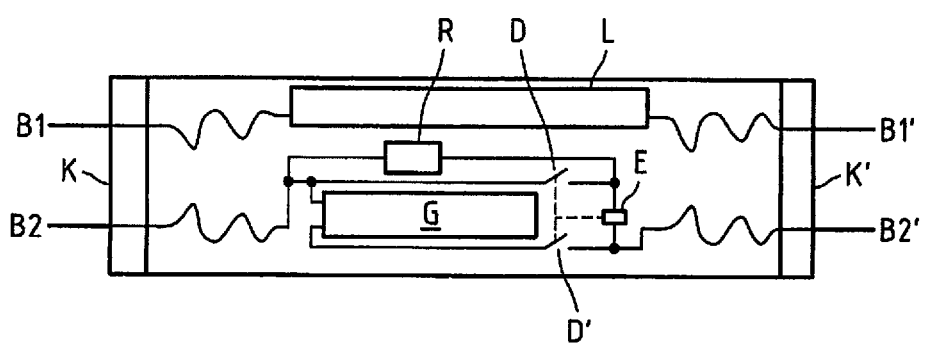
Figure 4C:
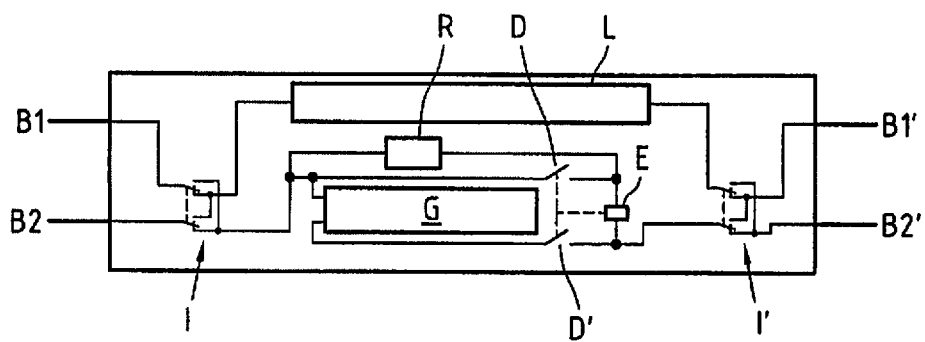
Figure 4D:
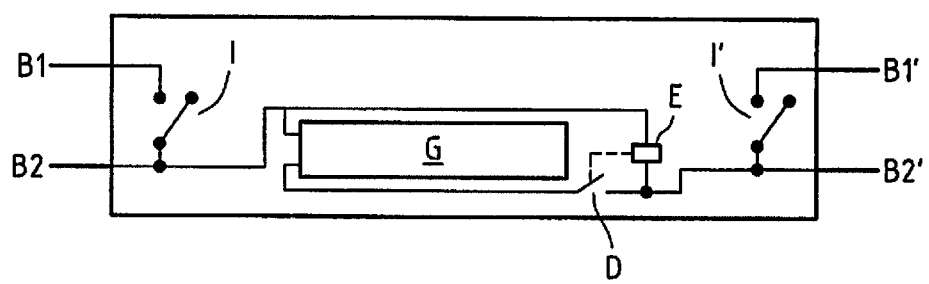
Figure 6A:
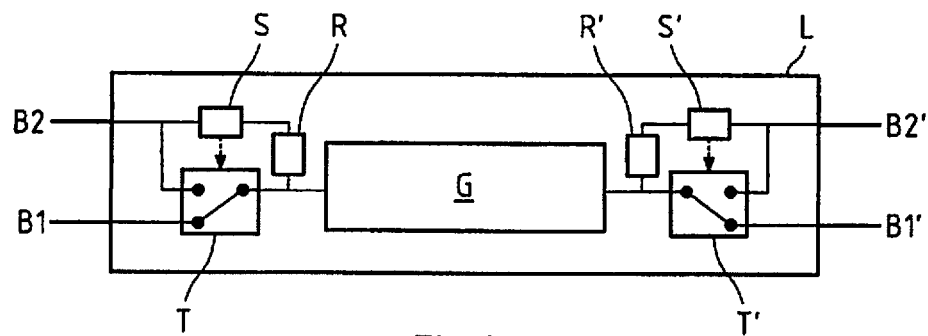
Figure 6B:
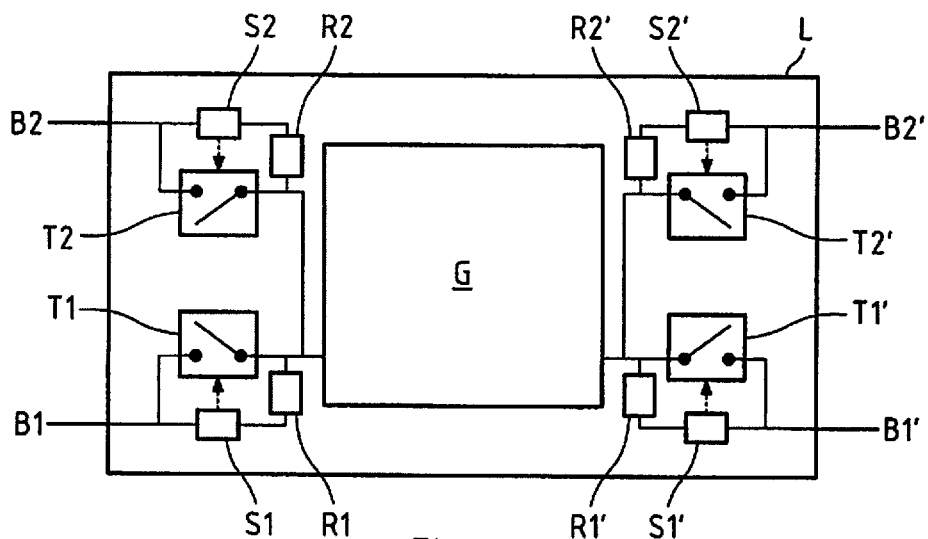
Figure 6C:
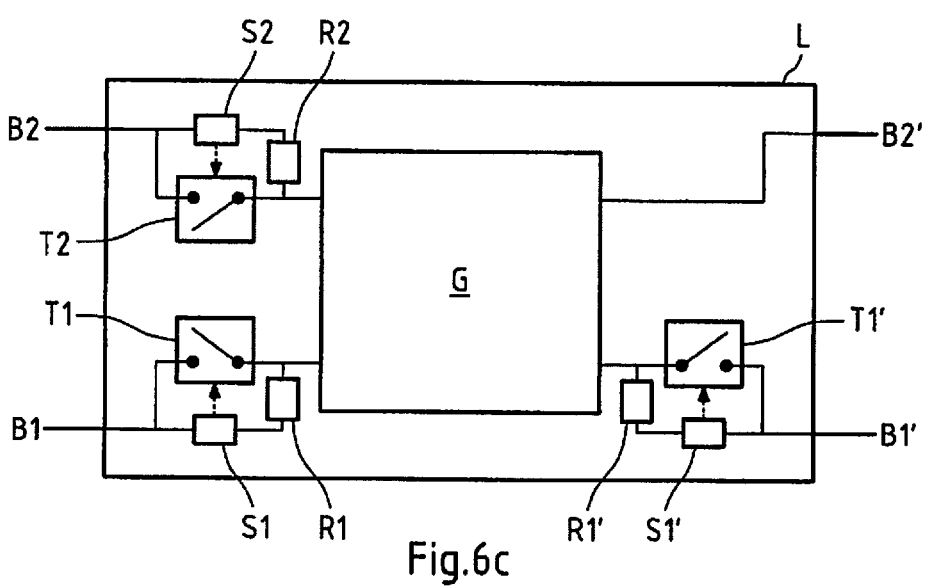
Figure 6D:
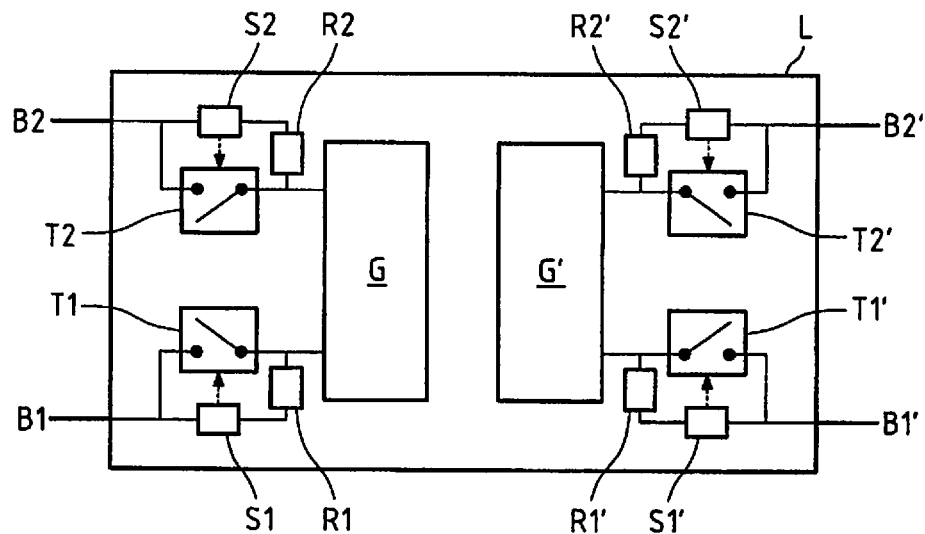
Figure 6E:
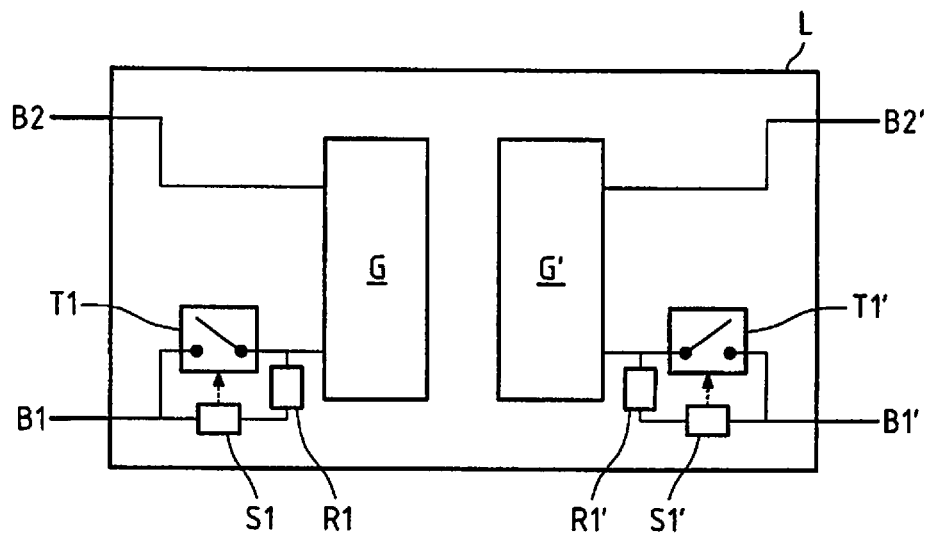
Figure 7:
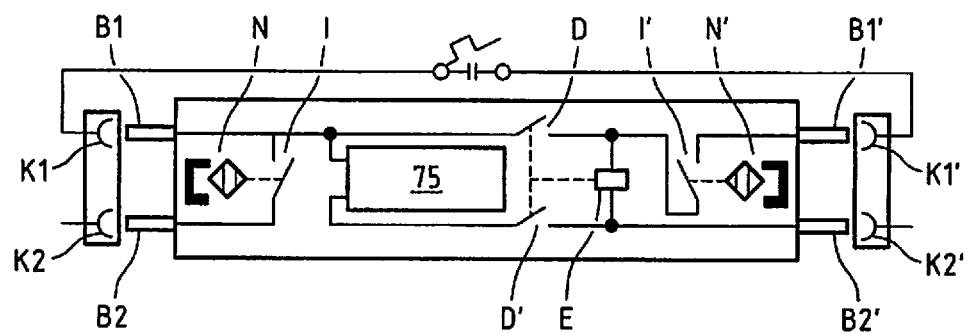
Figure 8:
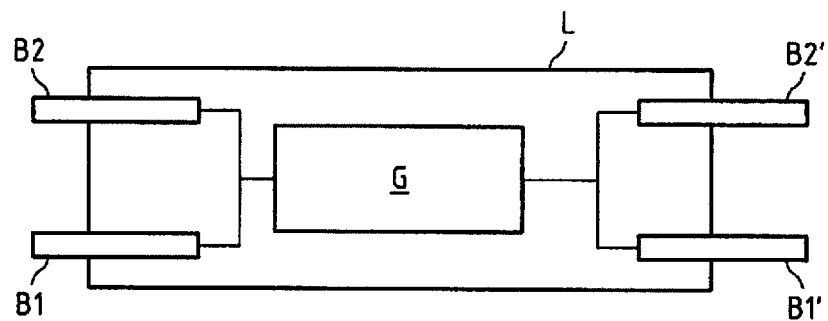
Figure 9A:
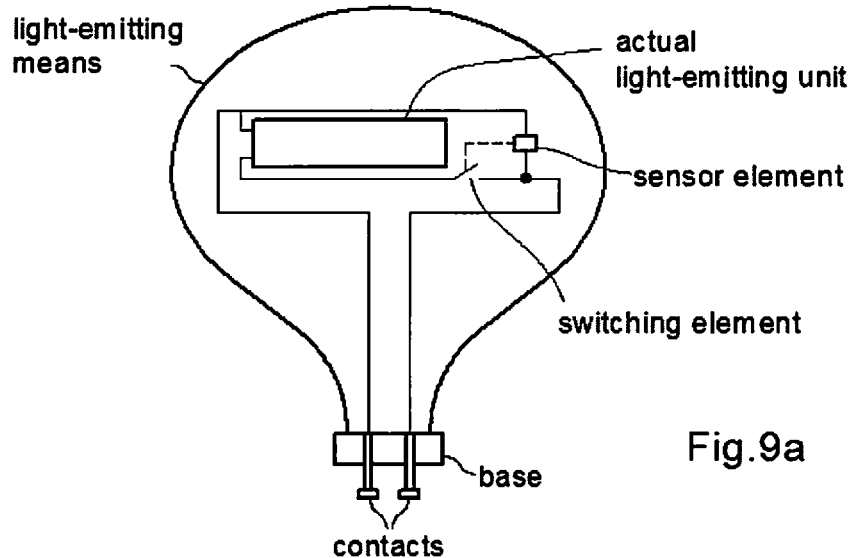
Figure 9B:
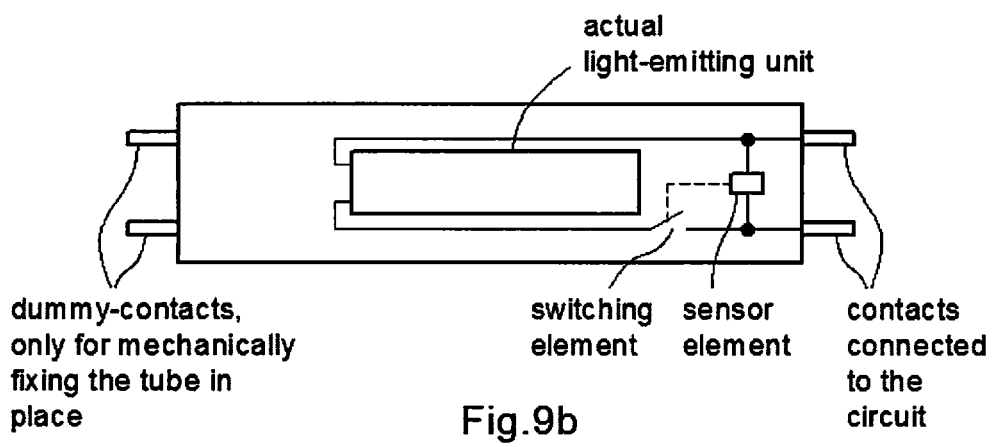
Figure 9C:
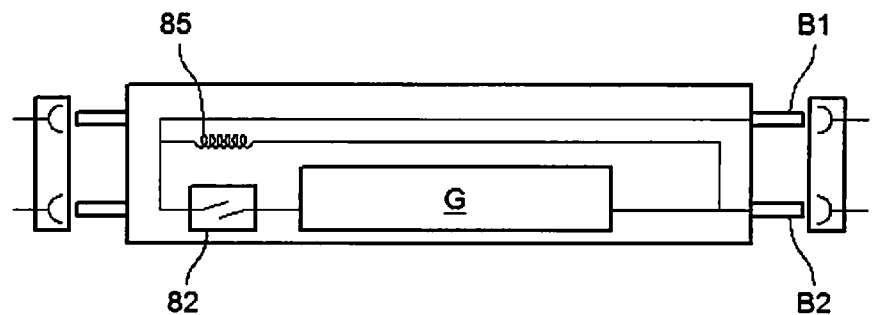
Figure 9D:
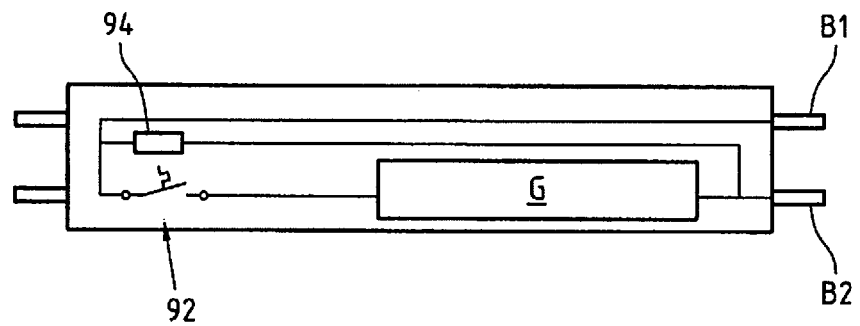
Figure 9E:
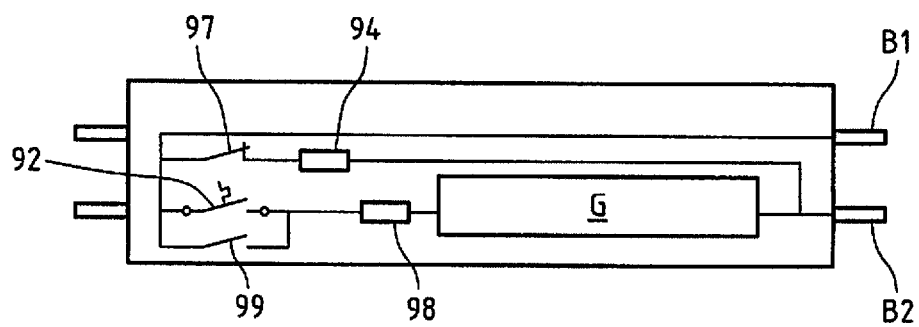
Figure 9F:
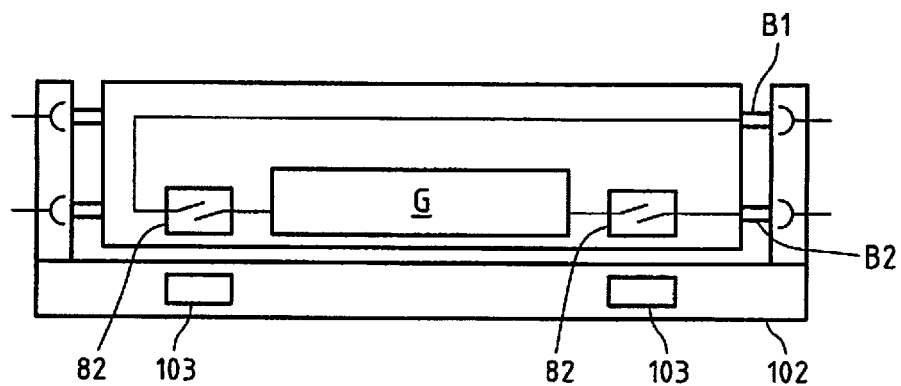
Figure 10A:
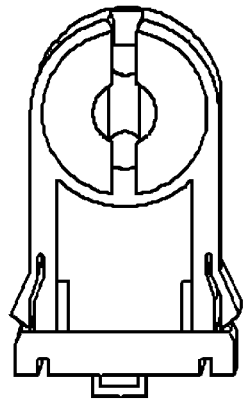
Figure 10B:
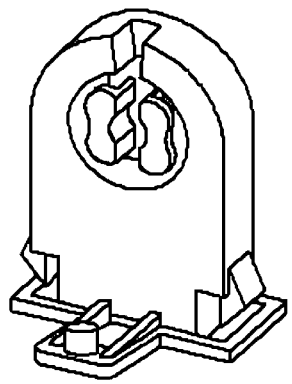
Figure 10C:
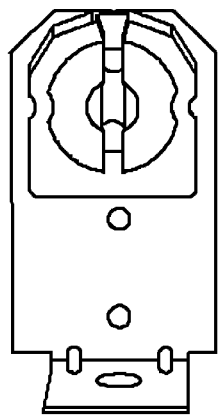
Figure 11:
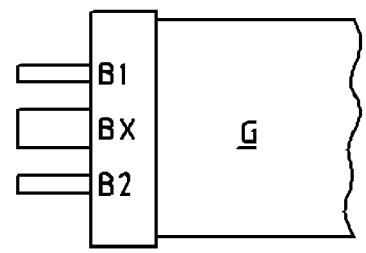
Figure 12A:
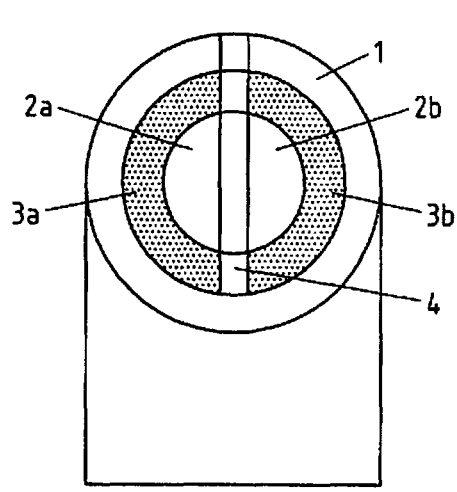
Figure 12B:
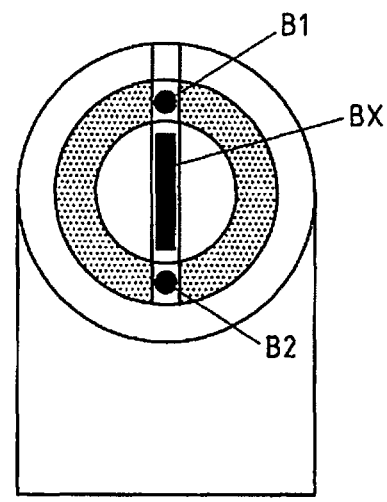
Figure 12C:
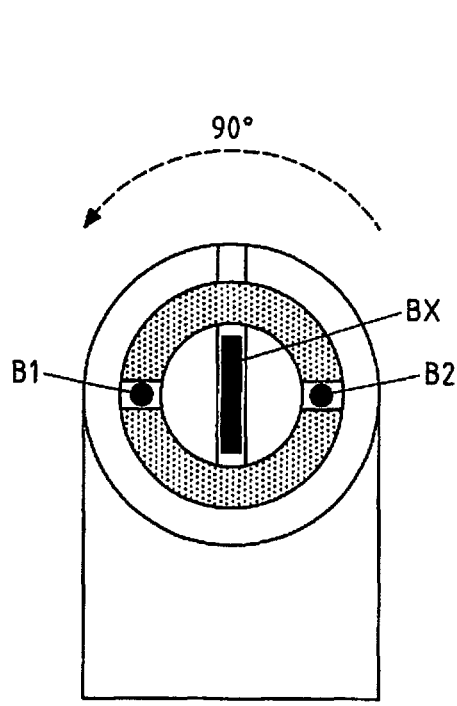
Figure 12D:
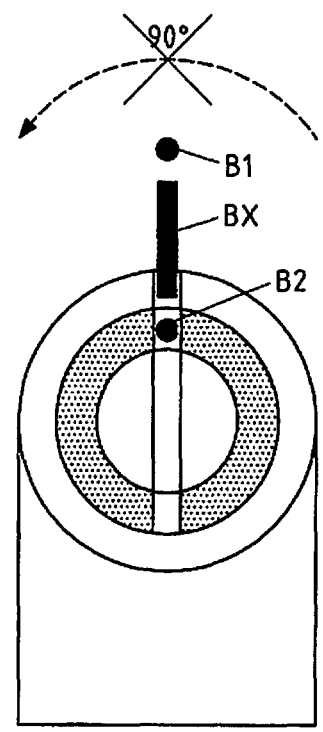
Figure 12E:
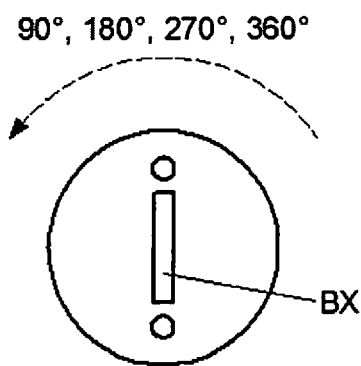
Figure 12F:
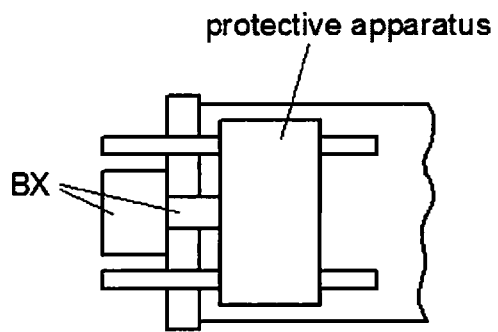
Figure 13:
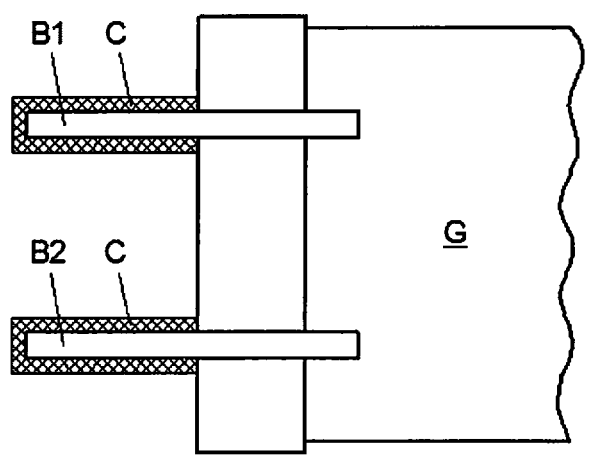
Figure 14:
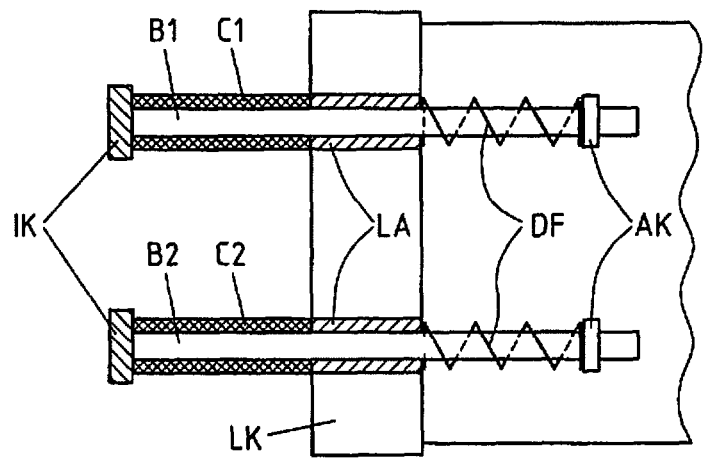
Figure 15A:
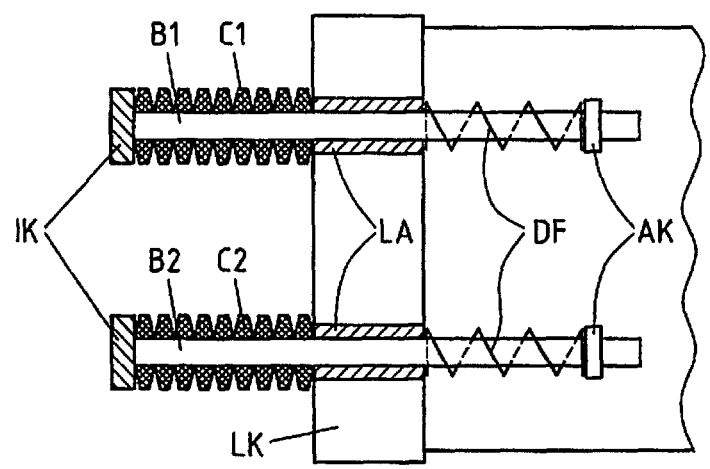
Figure 15B:
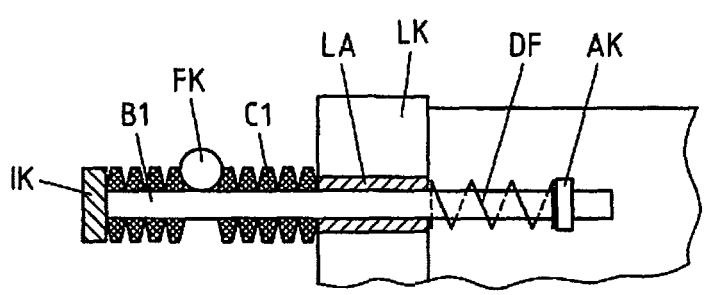

FIG. 1.*a-e* per se known light-emitting means,

FIG. 2.*a-c* light-emitting means with protective circuit with double-sided, bipolar switch, FIG. 3.*a-d* light-emitting means with protective circuit against the formation of a contact section spanning parasitic voltage, FIG. 4.*a-d* light-emitting means with protective circuit against the formation of a parasitic voltage, FIG. 5.*a-c* a light-emitting means with a multiway switch against the formation of a parasitic voltage, FIG. 6.*a* a light-emitting means with a protective circuit with electrically operated switches, FIG. 6.*b* a light-emitting means with four individually controlled on/off switches, FIG. 6.*c* a light-emitting means with simplified circuitry (compared to FIG. 6*a*), FIG. 6.*d-e* a light-emitting means with a protective circuit with electronically operated switches for light-emitting means with two individual light-generating units, FIG. 7 a light-emitting means with an electronic protective circuit against the formation of a parasitic voltage, FIG. 8 a light-emitting means with intrinsic semi-conductors, FIG. 9.*a* a light-emitting means with a protective circuit with an electronically operated switch for lampholders with only one lampholder base, FIG. 9.*b* a light-emitting means with a protective circuit with an electronically operated switch for light-emitting means for lamphoelrs with two holder bases, where only one holder base is current-carrying, FIG. 9.*c-f* a light-emitting means with a magnetic or thermal operated switch, FIG. 10.*a-c* conventional on the market fluorescent lampholder, FIG. 11 a light-emitting means with a mechanical apparatus to center the light-emitting means and to protect from the formation of side-immanent parasitic voltage, FIG. 12.*a* a sketch of a lampholder, FIG. 12.*b* a sketch of a lampholder with a light-emitting means which is inserted but not rotated to the end position, FIG. 12.*c* a sketch of a lampholder with an inserted light-emitting means and a closed circuit, FIG. 12.*d* a sketch of a lampholder with a light-emitting means in a blocked position FIG. 12.*e-f* a sketch of a rotatable, mechanical, self-restoring apparatus for activating a safeguard, FIG. 13 a light-emitting means with self-reactivating insulation to protect from a side-immanent electric shock in the form of a coating, FIG. 14 a light-emitting means with self-reactivating insulation to protect from electric shocks with spring-loaded contact pins, FIG. 15.*a* a light-emitting means with self-reactivating insulation to protect from electric shocks with spring-loaded contact pins and predetermined breaking points and FIG. 15.*b* the light-emitting means from FIG. 15A of an activated insulation (on top) and of a predetermined breaking point deactivated insulation (at the bottom).

PROTECTIVE CIRCUITS WITH MECHANICALLY OPERATED SWITCHES

In protective circuits with switches one can ward off the danger of the "side-immanent electric shock" by deactivating both contacts of one side in such a way, so that the electric connection between both contacts is interrupted.

A protective circuit with both sides each containing two bipolar switches A and E and A' and E', respectively is depicted in FIG. 2.*a*. The switching of both contacts of one contact section is advantageous when the light-emitting unit with surrounding electronics on both sides only has to be monopolarly connected, like depicted in FIG. 2.*b*. The jumper between the contacts B1 and B2 and B1' and B2', respectively is carried out after the switches, but directly before the light-emitting unit with surrounding electronics. This circuit also safely prevents a "side-immanent electric shock".

Depicted in FIG. 2.*c* is a mixed form for special circuits. This circuit variant can be implemented for manually operated rotating switches and/or flipswitches or buttons, for flip switches or buttons automatically operated during installation, but especially also for magnetic or thermally operated switches.

A mechanical electric shock protection of the contacts only offers protection from the formation of side-immanent parasitic voltage when both contacts of each side are individually and independently fused from the other contacts on their respective sides.

For circuits one wishes to fuse on both sides against "side-immanent electric shocks" and which have jumped contacts on both sides, it is possible in the simplest of cases to just use only one contact on each side for the light-emitting means and use the other contact as a holder. This is depicted in FIG. 3.*a*. This procedure requires that the contacts in the lampholder in both contact sections on the same side are connected to the power supply (phase or zero conductor).

Designated in FIGS. 3a, 3b, 3c, 3d, 4b, 4c and 4d are protective circuits against the formation of contact section spanning parasitic voltage. The circuits exhibit a sensor element E and a switch element D, D'. If requested, protective circuits against the formation of a contact section spanning parasitic voltage can be included in other designs, as needed. Also, other protective circuits against the formation of a contact section spanning parasitic voltage other than those depicted in FIGS. 3a, 3b, 3c, 3d, 4b, 4c and 4d can be implemented.

During a multiway configuration of the lampholder contacts one must implement a differently wired light-emitting means, for example in the form of an LED-tube in which for instance the contact B1 is connected instead of B2. To prevent this from happening, one or two double-throw switches I and I' can be incorporated into the LED-tube. This is depicted in FIG. 3.b. An alternative circuit is depicted in FIG. 4.d.

Alternatively, the connection of the electronics to the contact can be flexible or established using a wiper contact, as depicted in FIG. 3.c. The side cap K with the two contacts B1 (dead-ended) and B2 (connected), rotatable in 180° (and then locked if needed) can also be implemented.

Represented in FIG. 3.d is an alternative to the light-emitting means as per FIG. 3.b. Both switches I and I' are multiway switches. Moreover, a signal generator L is designated. Preferably it can generate an optical signal when it is plugged into the power supply from both sides and either is high-ohm to prevent any danger to a person through electric shocks or it is itself equipped with a protective circuit. If the signal generator L takes effect in a turned on circuit, then the switches I and I' must be thrown, so that the light-emitting unit G with surrounding electronics can be turned on. If neither L nor G react, then only one of the switches is to be thrown (or the light-emitting means is defective).

In FIG. 4.a light-emitting means is shown, in which on the left side a jumper is interrupted by a lockable switch (not a button). In the manual, the instruction to activate the switch only after fitting has ensued and to deactivate it before dismantling can be included. Alternatively, an automated button could be implemented, which would only need to do a monophasic interruption.

Right-sided, the relay element 73 would need to be implemented high-ohm enough, so that "side-immanent electric shock" can be avoided. Or the element must be connected in series with a corresponding high-ohm resistor or likewise with a button/switch (also like on the left side).

The component marked with 77 is a so called starter of a lampholder for fluorescent tubes. The starter can be jumped and if necessary, removed.

The set-up depicted in FIG. 4.b could be more sensible, in which originally the connection running through the starter (which for this purpose would have to be removed) would now be run internally by the light-emitting means. The originally external starter would be replaced by a resistor R (to guarantee sufficiently high resistance to limit the current, which can flow at a touch of an open contact) or in the simplest case by a jumper. Similarly like in FIG. 3.c, the adaptation to the polarity of the light-emitting means can occur through rotating cap (here in duplicate as K and K') or with multiway switches analogous to FIG. 4.c. This is for example possible through flexible feed lines or wiper contacts. An easy to construct and implement light-emitting means is represented in FIG. 4D, in which in between the contacts of each contact section double-th row switches I and I' (preferably operated manually) are to be placed. A signal generator L is used in this example, too, although it could alternatively be removed leaving the contacts B1 and B1' without internal connection.

A special type of the multiway switch can be constructed (as depicted in FIGS. 5.a and 5.b), by equipping the rotatable mounted or pluggable side caps A and the light-emitting means M with wipe contacts in such a way, that through rotation by 180° the polarity of the side caps reverses. The contact K1 is of the lampholder F is connected over the contact B1 of the side cap A, the wipe contact C1.1 and the counter contact D1 to the first port of the light-emitting unit G, while the contact K2 of the lampholder F is connected over the contact B2 of the side cap A and the wipe contact C2.1 and the counter contact D2 to the second port of the light-emitting driver or the light-emitting unit G. A rotation by 180° of the side cap A compared to the light-emitting means M around the common main axis leads to the named circuit remaining persistent (because of the shown circuit), while the contacts B1 and B2 switch sides and thus are inserted into the respective counter contacts in the lampholder (B1 into K2 and B2 into K1), while the orientation of the center section M remains the same. If the wipe contacts are spaced at different distances from the main axis as depicted, then they can individually or altogether perform as ring contacts. The contacts C1.1 and C1.2 and the contacts C2.1 and C2.2, respectively then form a ring-shaped contact C1 and C2.

Alternatively, the contacts can be arranged against one another at the same distance from the center line, although offset by angles (preferably 90°). This is represented in FIG. 5.c. Advantageously, the side cap A is lockable. Furthermore, the wipe contacts and the locking mechanism A can be implemented in such a way, so that a correction of the installation position of the center section by up to 90° in both directions is possible.

Protective Circuits with Electrical/Electronic or Magnetic Switches:

The manually operated double-throw and multiway switches I and I' of the light-emitting means in FIGS. 3.b, 3.d, 4.c and 4.d can be replaced by an electrical/electronic solution, in which the current-carrying connections are detected automatically and can respectively be passed on. The signal generators L can then be omitted without substitution.

In FIG. 6a a light-emitting means is depicted, in which the starter in the luminaire is removed. Shown is a light-emitting means L with the contacts B1 and B2 on one side, and the contact B1' and B2' on the other. The central unit of the light-emitting means is actually the light-emitting unit G, which can have an electronic control unit and optionally a protective circuit to prevent "parasitic voltage" from forming between both sides of the light-emitting means.

Both sides contain a button T and T', preferably "self-resetting switches", which when triggered establishes a connection between the contact B1/B1' and the light-emitting unit G. If the light-emitting means is inserted to the lampholder in such a way, so that the necessary voltage applies between the contacts B1 and B1', then the circuit is closed and a voltage applies to the light-emitting unit G. If it is fitted incorrectly, then the resistors R and R' as well as the internal resistances of the trigger button S and S' prevent the formation of a dangerous parasitic voltage within one side (from B1 to B2, or from B1' to B2').

If however there is no supply voltage applied to B1, but instead to B2, then the circuit for the trigger button S becomes closed, which "activates" the button T, interrupting the connection between the central unit G with the contact B1 and establishing instead a connection with the contact B2. The contact B1 is now completely decoupled from all other contacts, so that no formation of a parasitic voltage between B1 and B2 is possible.

To keep the button T in the activated state, the internal resistances of the button T and the trigger button S, the resistor R and the resistance of the light-emitting unit G are adjusted against each other in such a way, so that the trigger button S stays permanently functional while a supply voltage is applied activating the button T. Furthermore these resistances are dimensioned to such an extent, so that an accidental activation of the button through the touch of one or several contacts in a half fitted state of the light-emitting means is prevented.

The aforementioned circuit behavior is also achieved on the other side through the circuit elements R', S' and T' when a supply voltage is applied to B2. The time constants of the circuit are conducted in such a manner, that even in the case when the supply voltage is applied between B2 and B2', a safe switching is guaranteed.

Depicted in FIG. 6b is a light-emitting means with contacts B1, B2, B1' and B2', each containing a separate not-activated, current flow interrupting, self-resetting on-buttons T1, T2, T1' and T2', a trigger button S1, S2, S1' and S2' as well as a resistor R1, R2, R1' and R2'. If the light-emitting means is inserted into the lampholder in such a way, so that a necessary supply voltage is applied between the contacts B1 or B2 on the one hand, applied between B1' or B2' on the other hand, then the circuit becomes closed for the respective switches S1 or S2, or for the switches S1' or S2'. In turn, these switches S1, S2, S1' or S2' activate the on-button triggered by them, so that the light-emitting unit G can emit light. Both non-triggered on-buttons remain deactivated.

If the light-emitting means is applied only one-sided, all on-buttons remain deactivated. Thus the formation of a parasitic voltage both of the side-immanent and side-spanning variety becomes impossible. To reduce the power loss, the buttons can be equipped with a self-lock-controller. In this case an additional wiring could be included, which interrupts the circuit for the respective trigger button during the activation time. Also, two or three of the components R1, S1 and T1, or R2, S2, and T2, respectively can be taken together as a functional unit.

To keep the button T in the activated state, the internal resistances of the buttons and of the trigger buttons, the resistors R1, R2, R1' and R2' as well as the resistance of the light-emitting unit G need to be adjusted against each other in such a way, so that during an applied supply voltage the buttons can be activated safely. Furthermore these resistances are dimensioned to such an extent, so that an accidental activation of the button through the touch of one or several contacts in a half fitted state of the light-emitting means is prevented.

In the usage of a mechanically, electrically/electronically or magnetically operated switch on each side of the light-emitting means, the circuit on one of the sides of the light-emitting means can only be interrupted once to achieve a comprehensive protective effect of the light-emitting means, which are plugged in dipolarly. This is exemplified in FIG. 6d.

In light-emitting means with two from another independently operated light-emitting units G and G', each contact section can be separately secured with at least one protective circuit against the formation of side-immanent parasitic voltage. Such a light-emitting means is depicted in FIG. 5.2-4.

If solely side-immanent protection should be guaranteed, like in the case where a protection against the formation of side-spanning parasitic voltage is either not wanted or is already provided for, then one switch on each side of the light-emitting means can be omitted. Thus, a light-emitting means with two light-emitting units G and G' is possible, in which both of the contact sections are protected from the formation of side-immanent parasitic voltage through electrical wiring. The same principle is to be applied to light-emitting means with more than two contact sections, or if needed to those with at least two contact sections. One such light-emitting means is represented in FIG. 6.e. In these light-emitting means it suffices to interrupt the circuit only one time on each side of the light-emitting means.

The purposed protective effect is also given, when both light-generating units G and G' have a different voltage drop from one another, so that the whole voltage drop of the light-emitting means is distributed between both light-generating unit G and G' in a differing manner.

Alternatively, the light-emitting means in FIGS. 6.d and 6.e could be incorporated with a sole light-emitting unit and its protective circuit. The two non-current-carrying contacts of the non-current-carrying contact section could then be formed into a so called dummy-contact to ensure the fitting of the light-emitting means into a lampholder. It is also possible that merely one contact section is provided, namely the voltage-carrying one.

Light-emitting means with two opposite contact sections can thus be preferred, like when conventional lampholders for fluorescent tubes are to be used with the light-emitting means, which don't have to be fluorescent tubes. Other light-emitting means with fewer or more contact sections are viable.

In light-emitting means with light-emitting units G and G', similar to the light-emitting means in FIGS. 6.d and 6.e, it is also possible connect one contact of each contact section with each other over the lampholder, which causes both light-emitting units G and G' to be connected in series. For instance, this occurs by replacing the starter with a jumper when using commercially available lampholders. If every light-emitting unit (i.e. each contact section) has at least one corresponding protective circuit against the formation of side-immanent parasitic voltage, then this parasitic voltage is equally prevented from forming on each contact section separately like a side-spanning parasitic voltage. However, an analogous protective circuit could merely have one corresponding contact section or light-emitting unit G and G'. In this case, that contact section is at least protected from the formation of a side-immanent parasitic voltage. Simultaneously the formation of a side-spanning or contact section spanning parasitic voltage is prevented, due to the circuits of the light-emitting units G and G' being in series.

This also makes it possible to include a jumper which jumpers both contacts of the respective contact section, instead of the light-emitting unit G and G' not equipped with a protective circuit against the formation of parasitic voltage. A side-spanning or contact section spanning formation of a parasitic voltage is then further prevented. An advantage of having the light-emitting units or contact sections connected in series to a connection of each contact of a contact section to the lampholder is that the respective standard lampholders can be used with the described light-emitting means.

The one-sided jumper can also be actuated through a switching element, especially a button, which in the dismantled state is open. When being fitted into the lampholder, the switch is then actuated either manually or automatically, which closes the jumper between both contacts of this contact section. Preferably, during or after the removing of the light-emitting means from the luminaire this contact is interrupted again. Thereby, the forming of a parasitic voltage is also prevented in this contact section. The automatic actuation can be constructed according to an operating principle described in this document, for example mechanically as in FIGS. 11 and 12, magnetically as depicted in FIG. 9.*c* (where required with an additional resistor connected in series to the coil) and FIG. 9.*f*, thermally corresponding to FIGS. 9.*d* and 9.*e* or through a sensor-element-, switching-element-resistance solution as depicted in FIG. 2.4.2 (the button element T should possess a selfhold function).

Alternatively or additionally, both light-emitting units G and G' within the light-emitting means can be jumped to one another and would therefore be connected in series. The jumper is thus a component of the light-emitting means and not of the lampholder. Then there is preferably only one contact on each of the two contact sections or respectively one contact not connected (in any case not immediately connected) to the respective light-emitting unit G or G'. In this manner, the formation of a parasitic side-immanent parasitic voltage is avoided. If nevertheless a protective circuit preventing the formation of a side-immanent parasitic voltage is to be included, it would prevent the formation of a side-spanning or contact section spanning parasitic voltage regardless if actually two light-emitting units G and G' are to be included or if for instance instead of the second light-emitting unit the respective contact of the respective contact-section are jumped.

In a different implementation an electronic circuit could be achieved, by replacing the bridge on the left side of the light-emitting means (depicted in FIG. 4) with a contact I of an inductive proximity switch N. Furthermore, the connection between contact B1' to the relay E on the right side of the light-emitting means should ensue through an additional contact I' of an inductive proximity switch N' (cf. FIG. 7). These bring the respective contacts I and I' into contact with the metal contacts K1-K2 and K1'-K2' of the light-emitting means only after it has been fitted into the lampholder. The inductive proximity switches should be positioned and adjusted in such a way, so that the contacts B1/B2 and B1'/B2' have no influence on the switching behavior.

All manually or electrically/electronically operated switches can alternatively also be made to be magnetically operated switches. Then at least one magnet is mounted onto the light-emitting means or lampholder (preferably stuck on or clipped on) either before or after the fitting of the light-emitting means into the lampholder. In this way it could in some cases be switched between different contacts of a contact section. Alternatively or additionally an interruption of the circuit can also be achieved. If for example the switches A and A' in the light-emitting means (as depicted in FIGS. 2.*a*, 2.*b* and 2.*d*) are implemented as magnetically operated switches, then the additional switches E and E' can be left out.

When required, the aforementioned sensor-elements and switching-elements can be incorporated into the relay. The sensor element can also be designed as a magnetic coil and the switching element as a magnetic switch. Alternatively, the switching element can be an activatable switch while the sensor element can be a light-emitting element (particularly a light-emitting diode).

Protection from the formation of side-immanent and side-spanning parasitic voltage can also be achieved in a further implementation example when all contact pins and/or when one wiring element directly downstream from the contact pins is carried out in such a way, so that the contact pins or wiring elements only become electrically conducting when a voltage is applied to the contact pin. This can occur for example through the usage of intrinsic semi-conductors (with or without additional doping).

For example, the buttons T1, T2, T1' and T2' of the light-emitting means as depicted in FIG. 6.*b* could be replaced with intrinsic semi-conductors (either enabling or preventing the electron flux in the conduction band) and the trigger buttons S1, S2, S1' and S2' arranged in such a way, so that the intrinsic semi-conductors are set to a conducting state when the supply voltage is applied. Alternatively, two to four of the components B1, R1, S1 and T1 or B2, R2, S2, and T2 combined to a functional unit can be implemented with an intrinsic semi-conductor, although the element enabling or preventing the electron flux in the conduction band (like the button T1) should always be included.

The additional resistor R1, R2, R1' and R2' can assume a value of 0 ohm when using intrinsic semi-conductors. A configuration emerges, in which the contacts B1, B2, B1' and B2' are implemented as intrinsic semi-conductors and combine in a single component the functions of verifying the application of a supply voltage, enabling or preventing the electron flux in the conduction band and/or the triggering of the these functions. This exemplified in FIG. 8.

FIGS. 9.*a* and 9.*b* shows light-emitting means for lampholder with only one lampholder base or for lampholders with two bases, where only one base is current-carrying.

If a lampholder of a light-emitting means features more than two contacts, then protection from an electric shock through the formation of a parasitic voltage between the contacts can be attainable by the implementation of the here and subsequent described measures. For example, n contacts can have at least n−1 contacts with a protective unit consisting of sensor and switching elements. Alternatively, one or more sensor elements can act upon various switching elements. In the case of three contacts on one contact section, one sensor element could act upon two switching elements.

FIG. 9.*c* shows a light-emitting means with a protective circuit in the form of a magnetically operable switch 82. The circuit encompasses a primary electric circuit with a coil 85 (which in itself is high-ohm or is supplemented with a high-ohm resistor connected in series to the coil 85), so that a sufficiently small current is flowing between the contacts B2 and B2 to protect the user from the formation of a side-immanent parasitic voltage. The coil 85 generates a magnetic field when in the current-carrying state, which closes the switch 82. The circuit encompassing the light-emitting unit G becomes consequently closed.

Depicted in FIG. 9.*d* is a light-emitting means with a protective apparatus encompassing a thermal operable switch. Initially, the resistor 94 is heated through the voltage drop in itself, which in turn, because of its temperature, closes the switch 92 in the vicinity of it. Consequently, the light-emitting unit G encompassing circuit becomes closed. In addition to the heat resistor 94, it is possible that a high-ohm resistor can be implemented for the aforementioned reasons.

Depicted in FIG. 9.*e* is a light-emitting means with an additionally implemented switch 97 and a relay 98. As soon as the heat resistor 94 reaches a certain temperature, the switch 92 becomes closed, causing the relay 98 to open the switch 97 and closing the switch 99. The circuit encompassing the light-emitting unit G becomes consequently closed.

Depicted in FIG. 9.*f* is a light-emitting means with a magnetic protective apparatus. The light-emitting means is placed in a lampholder 102. In the correctly fitted state, the switches 82 of the light-emitting means are near the permanent magnet 103 of the lampholder 102, so that the switches 82 become closed, which consequently applies a voltage to the light-emitting unit G. If required, only one or more magnetically operable switch 82 can be implemented.

The at least one permanent magnet can be attached to the light-emitting means or the luminaire either before the fitting of the light-emitting means to the luminaire or after the dismantling of the light-emitting means, preferably stuck on or clipped on. The permanent magnet can be attached in such a way, so that it is separated from the light-emitting means when dismantling the light-emitting means from the lampholder and/or so that it has to be removed before the dismantling of the light-emitting means from the lampholder, preferably also having to separate it from the light-emitting means.

Protection Through Mechanical Devices and Mechanical Switches Arranged Around the Light-Emitting Main Axis:

Fluorescent tubes which are conventional on the market are held during fitting using both hands close to the lampholders and the pins of said fluorescent tubes are pushed into the lampholders. Then, the tubes are rotated through approximately 90°. Owing to the rotation, the contact pins of the lamp and the contacts of the lampholder are connected to one another and the electrical circuit is thus closed.

FIGS. 10a-10c show fluorescent lamp lampholders which are conventional on the market, in which a non-movable region is arranged in the center of the lampholder, and the contact pins of the light-emitting means can be rotated into the lampholder about said non-movable region. The non-movable region can be used to actuate a switch.

For this purpose, in the light-emitting means according to the invention and illustrated in FIG. 11, a non-conducting centering apparatus (BX) is arranged centrally between the two contact pins B1 and B2 and centers the light-emitting means in the lampholder and prevents improper insertion of the light-emitting means. The central centering apparatus (BX), which is non-conducting, i.e. for example is connected in non-conducting fashion to the circuit of the light-emitting means, is rotatable about the main axis (longitudinal axis) of the light-emitting means in the form of a rectangular contact pin. The rotatable, rectangular contact pin can be used, for example, for actuating a, preferably self-resetting, switch or another suitable protective apparatus. Particularly advantageous here is the simultaneous protection both against side-immanent electric shock and against electric shock as a result of formation of parasitic voltages between the light-emitting means ends. However, it is also possible for only one of the two types of formation of parasitic voltages to be prevented.

FIG. 12a illustrates schematically a lampholder base with rigid guide elements 1, 2a and 2b, contact zones 3a and 3b and an insertion channel 4. FIG. 12b also illustrates the contacts B1 and B2 and the centering apparatus BX of the light-emitting means after insertion into the insertion channel 4. In the arrangement illustrated in FIG. 12c, the contact pins B1 and B2 with the light-emitting means have been rotated into the contact zones 3a and 3b. The centering apparatus BX is in this case held by the guide elements 2a and 2b and thus rotated with respect to the rest of the light-emitting means (in this case through 90°). A two-pole switch A (not illustrated) is thus closed, as a result of which the light-emitting unit is supplied with voltage.

As illustrated in FIG. 12d, the centering apparatus BX of the light-emitting means is blocked mechanically by the guide element 1 of the lampholder element when only one of the two contacts B1 and B2 has been inserted in the lampholder element. The contact B2 cannot be pushed into the contact zone 3a or 3b. If the arrangement should have sufficient play in order to connect the contact B1 to one of the contact zones 3a or 3b, however, the rotary switch which is not yet switched on in this position of the centering apparatus BX prevents the formation of parasitic voltages at one of the other contact pins of the light-emitting means.

The other end of the light-emitting means can have a mirror-symmetrical design. The switch actuated by the centering apparatus BX can be activated in one, but preferably in both, directions of rotation in the case of a deflection of approximately 90°, preferably between 80° and 100°.

The protective circuit is illustrated schematically in FIGS. 12e and 12f.

Protection Through Reversible Insulation:

Safety against electric shocks can also ensue through an insulation, which after the removal of the light-emitting means completely regains its insulation characteristics. This occurs for example through insulating, elastic materials, which possess a "memory" of their original form and return to their initial form after undergoing an imposed deformation caused by a now absent external force. They are also known as materials with shape memory. If required, these materials can form an opening as well as "grow back together", i.e. close the opening.

The opening of the material can occur because of an imposed deformation. Shape memory allows surfaces (like cut edges) separated from one another to merge again after the imposed deformation has been discontinued. Materials with respective self-recovery characteristics are exemplified in the DE 19 921 142 A1, namely as protective coating of a disk. Electrical insulation from the respective materials are subsequently denoted as "reversible insulating".

Depicted in FIG. 13 is a reversible insulating coating C with contact pins B1 and B2, which protect the assembler during the assembly. The coating could consist of self-recovering materials. The insulation is specifically damaged by the spring contact of the lampholder when fitting it into the lampholder, enabling a contact for an electrical connection, closing the circuit. The spring contact of the lampholder uncovers the damaged area during dismantling, allowing the insulation to regain its original form. Thus, this also protects the assembler from electric shocks during disassemby.

Depicted in FIG. 14 is a contact section, in which on each of the contact pins B1 and B2 a reversible insulating sleeve C1 and C2 was placed. These sleeves are locked into place by respective insulating caps IK on the contact pins. The sleeves can consist of self-recovering materials. The caps are firmly joined to the respective contact pin. The contact pins B1 and B2 are led to the light-emitting end cap LK moveable through the bearing LA and each possess an upstand AK. A compression spring presses the contact pins into the interior of the light-emitting means as far as the insulation sleeves C1 and C2 allow it to. If the light-emitting means is inserted into a corresponding lampholder, then the contacts of the lampholder damage the insulating sleeves and thus allow a connection with the contact pins B1 and B2. If the light-emitting means is removed from the lampholder, then the springs AK cause the reversible insulating sleeves C1 and C2 to compress, restoring in a short amount of time an effective electric shock protection. If the insulating sleeves are made out of self-recovering materials, then the necessary external force to muster up a good self-recovery is attained.

Depicted in FIG. 15.a is a contact section with self-reactivating insulation. It has weakened material spots distributed along its entire length which function as predetermined breaking points. On the one hand, these weakened spots facilitate the establishing of the connection between the contacts during the fitting of the light-emitting means in the lampholder. On the other hand, because of the concentration of the insulation damage in a defined area, they also improve the regression of the insulation after removing the light-emitting means from the lampholder.

Depicted in FIG. 15.*b* is the activated insulation (on top) and the insulation deactivated through the spring contact of the lampholder in a predetermined breaking point (at the bottom).

The invention claimed is:

1. A light-emitting means for operation in a lampholders for fluorescent lamps which have an insertion channel that runs through it and a non-movable region arranged in the center of the lampholder, the light-emitting means comprising:
   a contact section for insertion into a lampholder base, comprising two contact pins and a non-conducting centering apparatus arranged centrally between the contact pins for centering the light-emitting means in the lampholder; and the non-conducting centering apparatus is rotatable with respect to the rest of the light-emitting means about a longitudinal axis of the light-emitting means for actuation of a rotary switch or a protective apparatus, inside the housing of the light-emitting means; and wherein the centering apparatus of the light-emitting means is blocked mechanically by a rigid guide element of the lampholder element when only one of the two contact pins has been inserted in the lamp holder element.

2. The light-emitting means as claimed in claim 1, wherein the centering apparatus is connected in non-conducting fashion to the rotary switch or the protective apparatus; and the rotary switch or the protective apparatus prevents side-immanent formation of parasitic voltages, parasitic voltages between two contact sections, or a combination thereof.

3. The light-emitting means as claimed in claim 1, wherein the protective apparatus has a mechanically actuated switch.

4. The light-emitting means as claimed in claim 2, wherein the protective apparatus has a mechanically actuated switch.

5. The light-emitting means as claimed in claim 1, wherein the rotary switch is actuated by rotation of the centering apparatus through approximately 90°.

6. The light-emitting means as claimed in claim 2, wherein the rotary switch is actuated by rotation of the centering apparatus through approximately 90°.

7. The light-emitting means as claimed in claim 3, wherein the rotary switch is actuated by rotation of the centering apparatus through approximately 90°.

8. The light-emitting means as claimed in claim 1, wherein the rotary switch is in the form of a single or double two-pole rotary switch.

9. The light-emitting means as claimed in claim 2, wherein the rotary switch is in the form of a single or double two-pole rotary switch.

10. The light-emitting means as claimed in claim 3, wherein the rotary switch is in the form of a single or double two-pole rotary switch.

11. The light-emitting means as claimed in claim 5, wherein the rotary switch is in the form of a single or double two-pole rotary switch.

12. The light-emitting means as claimed in claim 1, wherein the rotary switch is self-resetting.

13. The light-emitting means as claimed in claim 2, wherein the rotary switch is self-resetting.

14. The light-emitting means as claimed in claim 3, wherein the rotary switch is self-resetting.

15. The light-emitting means as claimed in claim 5, wherein the rotary switch is self-resetting.

16. The light-emitting means as claimed in claim 8, wherein the rotary switch is self-resetting.

17. The light-emitting means as claimed in claim 1, wherein light-emitting diodes (LEDs) in the form of conventional LED-technology, SMD-LED-technology, low voltage LEDs, low tension LEDs (for example 115V/230 V-LEDs), organic LEDs (OLEDs) or organic light-emitting transistors (OLET) are provided as light emitting unit.

18. The light-emitting means as claimed in claim 1, wherein light-emitting diodes (LEDs) in the form of conventional LED-technology, SMD-LED-technology, low voltage LEDs, low tension LEDs (for example 115V/230 V-LEDs), organic LEDs (OLEDs) or organic light-emitting transistors (OLET) are provided as light emitting unit.

19. The light-emitting means as claimed in claim 3, wherein light-emitting diodes (LEDs) in the form of conventional LED-technology, SMD-LED-technology, low voltage LEDs, low tension LEDs (for example 115V/230 V-LEDs), organic LEDs (OLEDs) or organic light-emitting transistors (OLET) are provided as light emitting unit.

20. The light-emitting means as claimed in claim 5, wherein light-emitting diodes (LEDs) in the form of conventional LED-technology, SMD-LED-technology, low voltage LEDs, low tension LEDs (for example 115V/230 V-LEDs), organic LEDs (OLEDs) or organic light-emitting transistors (OLET) are provided as light emitting unit.

21. The light-emitting means as claimed in claim 8, wherein light-emitting diodes (LEDs) in the form of conventional LED-technology, SMD-LED-technology, low voltage LEDs, low tension LEDs (for example 115V/230 V-LEDs), organic LEDs (OLEDs) or organic light-emitting transistors (OLET) are provided as light emitting unit.

22. The light-emitting means as claimed in claim 12, wherein light-emitting diodes (LEDs) in the form of conventional LED-technology, SMD-LED-technology, low voltage LEDs, low tension LEDs (for example 115V/230 V-LEDs), organic LEDs (OLEDs) or organic light-emitting transistors (OLET) are provided as light emitting unit.

23. The light-emitting means of claim 1, wherein the centering apparatus is a rectangular contact pin.

24. The light-emitting means of claim 1, wherein the lamp holder is a bi-pin G13 push-through shunted or non-shunted lamp holder.

25. The light-emitting means of claim 1, wherein the protective apparatus comprises a mechanically actuated rotary potentiometer.

26. The light-emitting means of claim 5, wherein the rotary switch is actuated by rotation of the centering apparatus in both directions of rotation in the case of a deflection through 80° and 100°.

27. The light-emitting means of claim 6, wherein the rotary switch is actuated by rotation of the centering apparatus in both directions of rotation in the case of a deflection through 80° and 100°.

28. The light-emitting means of claim 7, wherein the rotary switch is actuated by rotation of the centering apparatus in both directions of rotation in the case of a deflection through 80° and 100°.

29. The light-emitting means as claimed in claim 25, wherein the rotary potentiometer is in the form of a single or double, rotary potentiometer which is adjusted between a high-resistance position and a low-resistance position; and in the high resistance position, the potentiometer acts as protection against formation of parasitic voltages; and in the installed state of the light-emitting means, the potentiometer is adjusted to a low resistance in order to reduce losses; and the high resistance value may be of the order of magnitude of mega ohms, while the low resistance value is several orders of magnitude below the high resistance value.

* * * * *